Patented Aug. 27, 1940

2,213,127

UNITED STATES PATENT OFFICE 2,213,127

PROCESS AND PRODUCT FOR TREATING ENSILAGE

Friedrich P. Kerschbaum and Ernest C. Dybdal, Dayton, Ohio, assignors to Monsanto Chemical Company, a corporation of Delaware No Drawing. Application May 31, 1939, Serial No. 276,562

12 Claims. (Cl. 99—8)

This invention relates to a process for preserving ensilage.

An object of this invention is to provide a process for treating ensilage. A further object is to provide a process for treating ensilage containing protein material in order to control the character of fermentation occurring upon storage in silos, etc.

In prior known processes for treating ensilage it has been the custom to treat certain types of vegetation with various mineral acids such as sulphuric, hydrochloric and phosphoric and mixtures thereof. The object of the addition of such acid to ensilage is the control of the type of fermentation undergone by ensilage upon storage. Ordinary mineral acids, with the exception of phosphoric acid, do not add any element of food value to the ensilage and hence are used only to control the hydrogen ion concentration. The method of addition of these strong acids to ensilage creates a problem of handling, with which the farmer is usually not equipped to cope. These acids being quite corrosive must be handled in corrosion resisting equipment and such equipment is not usually found on an ordinary farm.

One method for adding this acid to ensilage is to feed a stream of acid into the ensilage cutter or into the fan used for filling the silo, or else to spray the liquid acids into the silo as it is being filled. When strong mineral acids are handled in this way, it is obvious that this equipment is subjected to severe corrosion influences.

We have now discovered that ensilage may be treated with molecularly dehydrated derivatives, compounds or mixtures of strong phosphoric acid. Such compounds as pyrophosphoric acid, metaphosphoric acid, octerohexaphosphoric and ennerohexaphosphoric acid are contemplated as within the scope of this invention. We have found that these molecularly dehydrated derivatives, compounds, or mixtures of orthophosphoric acid, $H_3PO_4$, may be added to ensilage either while the former is in the liquid or solid form and without serious corrosion upon the ensilage cutting and conveying equipment and furthermore, that these derivatives of orthophosphoric acid will upon storage in the silo in contact with moist ensilage, hydrate to acids of higher alkali neutralizing capacity. We have found for example, that on exposure to ensilage containing moisture that ennerohexaphosphoric acid will in a relatively short time hydrate to metaphosphoric acid, $HPO_3$, and further, that the metaphosphoric acid will hydrate to orthophosphoric acid with the formation of some pyrophosphoric acid. Per unit weight of phosphoric acid contained, we have found that the metaphosphoric acid will have a greater alkali neutralizing capacity, and hence the ability to produce a lower hydrogen ion concentration in the ensilage than the ennerohexaphosphoric acid. In the same manner, the pyrophosphoric acid has a greater alkali neutralizing capacity than the metaphosphoric acid, while the orthophosphoric acid has a greater alkali neutralizing capacity than the pyrophosphoric acid. These progressive hydrolysis reactions may be made to take place without the necessary addition of water, altho water may be added if desired.

For the purpose of preservation of high protein ensilage such as may be made from grasses and legumes, we find it desirable to add from 3 to 8 pounds of phosphorus in the form of any of the molecularly dehydrated derivatives of orthophosphoric acid per ton of ensilage. This amount of phosphorus will produce a hydrogen ion concentration equivalent to a pH of less than 4. The molecularly dehydrated derivatives of strong phosphoric acid may be prepared in the form of liquids or solids. We have found that derivatives of orthophosphoric acid having a lower phosphorus content than metaphosphoric acid may be generally prepared in the liquid state and as such may be added directly to the ensilage before or after loading into the silo. Acids of higher phosphorus content than metaphosphoric acid will generally be most conveniently prepared as glassy solids and as such may be prepared in powdered form for convenience in application to the ensilage.

In order to further the general objects of the present invention, the moleclularly dehydrated forms of orthophosphoric acid herein contemplated may be used as free acids or they may be used associated with certain bases, particularly with lime, potash, or soda. The addition of such bases to the acid herein disclosed results in raising the softening or melting points of these acids whereby it is possible to produce the ordinary liquid forms of these acids in a glassy or brittle form for application as a dry powder. In general the amount of such bases which may be added will vary from 5 to 10 percent of either $CaO$, $K_2O$ or $Na_2O$ based upon the weight of the acid. Such bases may be present in solution in the acid or they may be combined in various compounds such as the polyphosphates or as mixtures of these or other compounds. In general the amount of such bases added to our molecularly dehydrated phosphoric acids should be confined to the amount necessary to produce the physical property desired.

Molecularly dehydrated acids and compounds or mixtures thereof of various bases may be applied to the ensilage in the form of aqueous solutions which solutions may be prepared before application to the ensilage by dissolving the compound in water to form a solution which will readily flow thru the feeding device employed. The solid glassy dehydrated forms of orthophosphoric acid produce a crackling noise when added to water, which may serve as an audible indication to the user that solution is taking place.

The derivatives of orthophosphoric acid which it is contemplated within the scope of this invention may be expressed by the formula $$H_3PO_4 - M(H_2O)$$

where $M = 1/3$ to $1\frac{1}{3}$.

Thus when $M = 1/3$, the acid will have a composition corresponding to the formula: $H_7P_3O_{11}$. When $M = 1\frac{1}{3}$, the acid will have the composition corresponding to the formula: $H_2P_6O_{16}$. The former acid $H_7P_3O_{11}$ is termed triterohexaphosphoric acid, and has a $P_2O_5$ content of 77.16%. The latter acid, $H_2P_6O_{16}$, is termed ennerohexaphosphoric acid and has a $P_2O_5$ content of 95.94%. Various other acids or mixtures of acids between the limits above set out may be employed, in addition to those already enumerated. They are tetraphosphoric acid $H_6P_4O_{13}$ with a $P_2O_5$ content of 84%, hexerohexaphosphoric acid, $H_8P_6O_{19}$ with a $P_2O_5$ content of 85.53%, decaphosphoric acid, $H_{12}P_{10}O_{31}$ with a $P_2O_5$ content of 86.79% and octerohexaphosphoric acid $H_4P_6O_{17}$ with a $P_2O_5$ content of 92.20%. Such acids as are here enumerated are considered as molecularly dehydrated phosphoric acids and may be considered as being derived from the orthophosphoric acid, $H_3PO_4$, by the loss of water as by heating.

These acids may also be conveniently prepared by the controlled hydration of phosphorus pentoxide, $P_2O_5$, by which we contemplate the addition of the pentoxide to water or to various phosphoric acids, at ordinary or at elevated temperatures.

The addition of bases such as $CaO$, $K_2O$, $Na_2O$ or others is contemplated as a means of producing acidic derivatives of the above enumerated acids of phosphorus. The addition of such bases may have the effect of increasing palatability of the ensilage and also in solidifying the liquid forms of phosphoric acid herein disclosed so that application of the acid in the solid form may be readily accomplished. For example metaphosphoric acid, $HPO_3$, may be prepared to contain say 10% of calcium metaphosphate $Ca(PO_3)_2$ in which case the otherwise sticky highly viscose metaphosphoric acid is changed to a brittle glassy solid of reduced hygroscopicity which can be ground and shipped in powdery form for easy application to ensilage.

A composition such as above described consisting primarily of metaphosphoric acid and calcium metaphosphate containing from 5 to 15% of the latter may be prepared by fusion of the ingredients in a crucible or in a hearth type furnace and thereupon produced in a pellet type product by atomizing with air or by allowing the material merely to fall dropwise through a cooled gas space or upon a cooled metallic plate.

The solid forms of dehydrated phosphoric acids containing bases or not as desired may also be prepared in molten form and quickly cooled by dropping small beads of such acids upon a cooled metal plate. The small bead-like particles may then be coated with powdered lime, calcium carbonate, mono, di or tricalcium phosphate or a chemically inert compound such as clay which is made to adhere to the surfaces of the particle by a sticky film developed upon the surface by virtue of the hygroscopic nature of the dehydrated phosphoric acid. Thus coated, the particles may be subjected to any reasonable degree of humidity and packed, shipped and applied to ensilage in convenient form without danger to man or to equipment.

The hygroscopic acids may also be packed (and thus coated) in a container with any salt which may be included in a cattle feeding ration.

What we claim is:

1. A process of preserving ensilage comprising spraying upon green ensilage an aqueous solution of a derivative of a dehydrated orthophosphoric acid, and then storing said treated ensilage in a silo.

2. Process for preserving ensilage comprising adding to ensilage a dehydrated phosphoric acid derivative capable of reacting with water to produce a compound of enhanced alkali neutralizing capacity.

3. Process for preserving ensilage comprising adding to green ensilage a dehydrated phosphoric acid compound capable of combining with water to form a compound of enhanced alkali neutralizing capacity and thereupon storing said ensilage in a silo.

4. Process for preserving ensilage comprising adding to ensilage a composition of the class consisting of $H_3PO_4 - M(H_2O)$ where M has a value of from $1/3$ to $1\frac{1}{3}$, said composition containing a minor proportion of a base.

5. Process for preserving ensilage comprising adding to ensilage a composition of the class consisting of molecularly dehydrated phosphoric acids in major proportion and a base in minor proportion.

6. Process for preserving ensilage during storage comprising adding to ensilage a solid, molecularly dehydrated phosphoric acid associated with a base and adapted to hydrolyze during storage to produce in said silage a hydrogen ion concentration less than $pH = 4$.

7. Process for preserving ensilage by storage in silos comprising adding to said ensilage a solid, molecularly dehydrated phosphoric acid containing a minor proportion of lime and adapted to hydrolyze during storage to produce in said silage a hydrogen ion concentration of less than $pH = 4$.

8. A composition for preserving ensilage comprising a molecularly dehydrated phosphoric acid, corresponding to the composition $$H_3PO_4 - M(H_2O)$$

where M may vary from $1/3$ to $1\frac{1}{3}$, associated with a minor amount of a lime base.

9. An article of manufacture adapted for preserving ensilage comprising a molecularly dehydrated phosphoric acid in pellet form coated upon the exterior surface thereof with a lime base.

10. A composition for preserving ensilage comprising metaphosphoric acid, $HPO_3$, in pellet form containing in solid solution from 5% to 10% of calcium metaphosphate.

11. An article of manufacture for preserving ensilage comprising metaphosphoric acid, $HPO_3$, in pellet form coated with a lime base coating held upon the surface thereof by means of the reaction product of water and said metaphosphoric acid.

12. An article of manufacture for preserving ensilage comprising a molecularly dehydrated phosphoric acid in pellet form coated upon the exterior surface thereof with finely divided clay.

FRIEDRICH P. KERSCHBAUM.
ERNEST C. DYBDAL.